Dec. 10, 1935. C. H. BEACH 2,023,460
AGITATING MACHINE
Filed Feb. 13, 1932 2 Sheets-Sheet 1
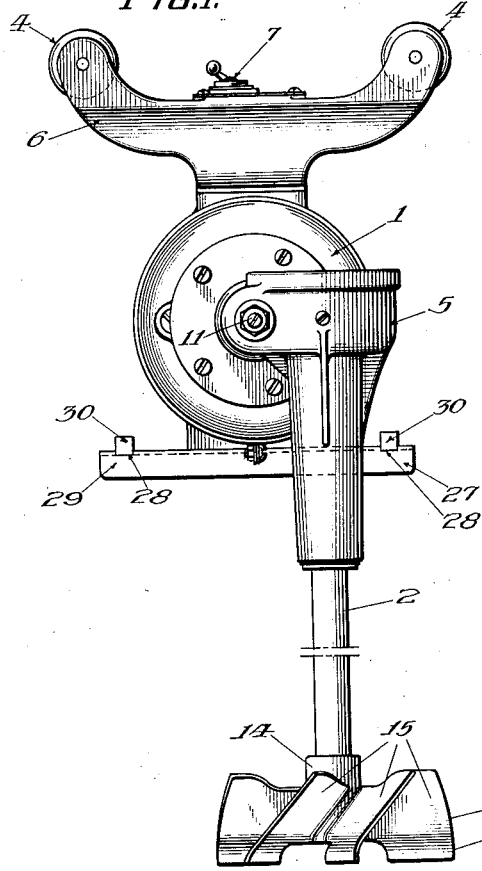
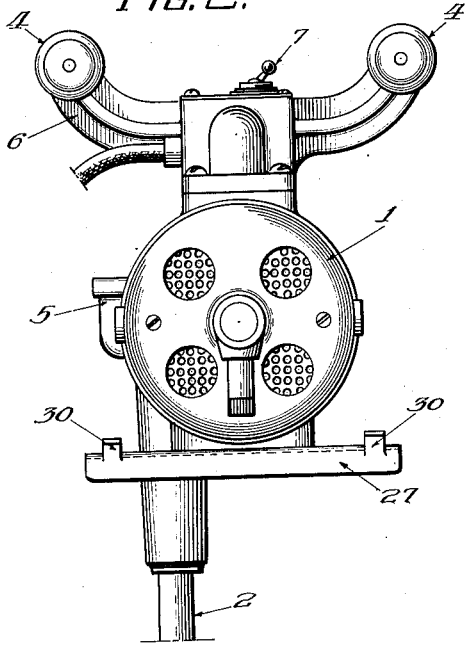
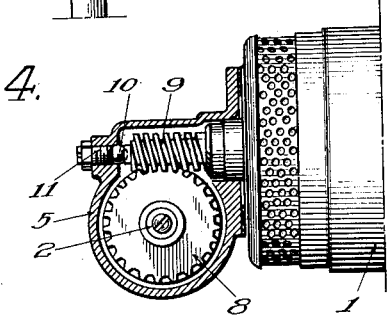
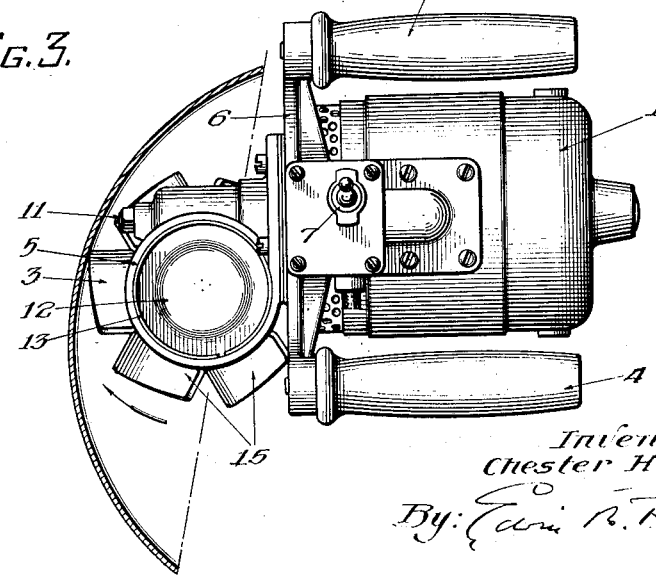
Inventor:
Chester H. Beach,
By: [signature]
Attorney Dec. 10, 1935.     C. H. BEACH     2,023,460
AGITATING MACHINE
Filed Feb. 13, 1932     2 Sheets-Sheet 2
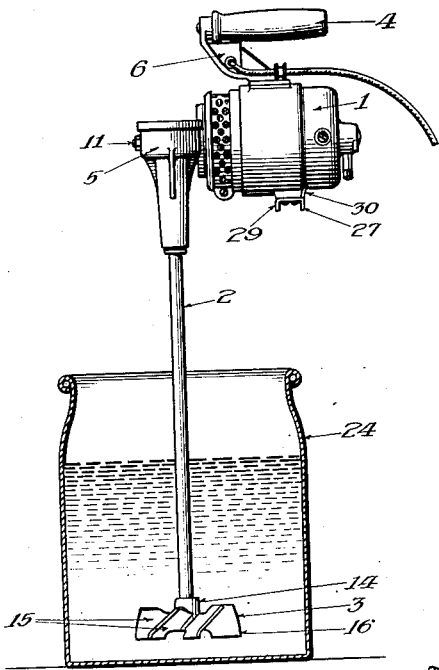
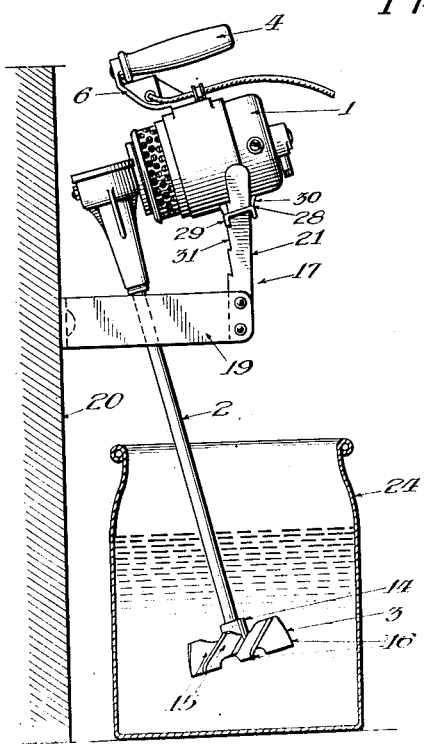
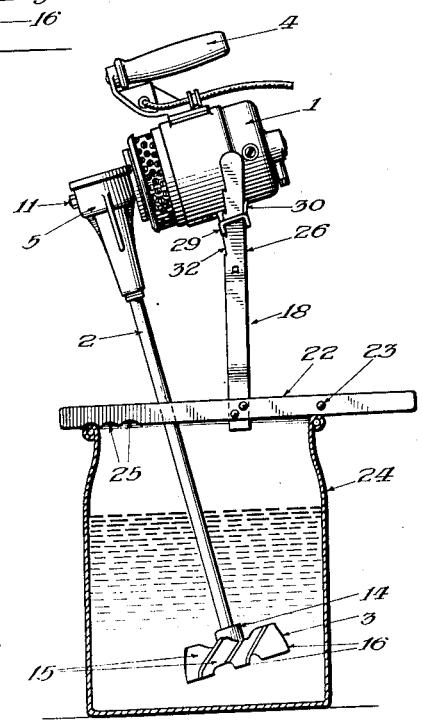
Inventor:
Chester H. Beach,
By Edwin B. [illegible], Jr
Attorney Patented Dec. 10, 1935

2,023,460

UNITED STATES PATENT OFFICE 2,023,460

AGITATING MACHINE

Chester H. Beach, Racine, Wis., assignor, by mesne assignments, to S. C. Johnson & Son, Inc., Racine, Wis., a corporation of Wisconsin Application February 13, 1932, Serial No. 592,677

6 Claims. (Cl. 259—108)

The invention relates to agitating machines.

The agitating machine to which the invention applies in particular is of the type which is employed for mixing paints and other mixtures and which is provided with a portable frame having handles connected thereto, an electric motor carried by the frame, a shaft depending from the frame and driven by the motor, and an agitator carried by the shaft at the lower end thereof.

An object of the invention is to provide a portable agitating machine which may be easily and readily carried and manipulated to guide and position its agitator.

Another object is to provide an agitating machine which is small and compact.

Another object is to provide an agitating machine with an agitator which will gradually remove adherent or coagulated pigment or other plastic or solidified matter from the lower part of the mixing container and readily mix it with the liquid contents thereof.

Another object is to provide an agitating machine with an agitator which will remove adherent or coagulated pigment or other plastic or solidified matter from the lower corners of the mixing container.

Another object is to provide the agitating machine with a rack to support the same in operating position above a mixing container.

Another object is to provide the agitating machine with a rack to support the same above a mixing container with its agitator at an angle to the level of the liquid therein.

According to the invention as ordinarily applied and embodied in practice, a mixing or agitating machine is provided with a portable carrying frame having two parallel handles arranged endwise relative to the operator to carry and suspend the machine and having the center of gravity of the entire machine in its operative position disposed intermediate the handles and the ends thereof, a rotatable shaft depending from the frame and carried thereby, an electric motor carried by the frame to drive the shaft, and an agitator carried by the shaft at the lower end thereof.

According to the invention in another aspect, the agitator is provided with radial blades which are inclined to its axis and have the outer end of each blade arranged within the radius of its forward edge.

According to the invention in still another aspect, the agitating machine is provided with a rack or support upon which it is supported in a stationary position relative to the mixing container and adjustable to different elevations.

The invention is embodied in the portable agitating machine illustrated in the accompanying drawings in which the views are as follows:

Fig. 1 is a front view,

Fig. 2 is a rear view,

Fig. 3 is a top plan view,

Fig. 4 is a sectional plan view showing the drive for the agitator shaft,

Fig. 5 is a side view,

Fig. 6 is a side view showing the agitating machine provided with a stationary rack or support, and Fig. 7 is a side view showing the machine provided with a portable rack.

The agitating machine, in general, is provided with a horizontal electric motor 1, a vertical shaft 2, an agitator 3, and handles 4.

The motor has attached to its frame or casing upon one end thereof a removable bearing bracket 5 to carry the agitator shaft.

The motor casing and the bearing bracket form a portable carrying frame.

The handles are arranged above the carrying frame parallel to the motor shaft and upon opposite sides thereof.

The handles are connected to the carrying frame by a removable handle bar or bracket 6 attached to the motor casing.

The entire weight of the machine is below the handles with its center of gravity between the same and intermediate the ends thereof.

The handles are arranged endwise to the operator and facilitate carrying and controlling the machine and manipulating its agitator to guide and position the same.

The motor is controlled by a switch 7 which has its actuator arranged between the handles in position to be readily manipulated without removing either hand from a handle.

The agitator shaft has a bearing in the bracket 5 and is rotated therein by a screw gear 8 which is secured to its upper end and arranged within the bracket 5.

The screw gear 8 meshes with a worm or screw 9 which is secured to or formed upon the shaft of the motor.

The outer end of the screw 9 is supported by a ball bearing 10 which is held in position by an adjusting screw 11 threaded through the wall of the bearing bracket and ordinarily provided with a suitable lock nut.

The ball bearing takes the thrust of the screw and thereby prevents axial displacement of the motor shaft.

The gear 8 and the screw 9 are entirely enclosed within the upper end of the bearing bracket 5 which is closed by a top cover plate 12 held in position by an expansion ring 13.

The agitator 3 has a hub 14 which is secured to the agitator shaft at the lower end thereof, and radial blades 15 spaced around the hub.

The agitator rotates in the direction indicated by the arrow shown in Fig. 3, and the blades are inclined upwardly and rearwardly in respect to the direction of rotation.

The blades have the lower or forward edges thereof arranged in the same plane, and each blade is shaped to provide a lower or forward part 16 which is perpendicular to that plane.

The pigments or solids in paint and other mixtures precipitate or separate and form a solidified or coagulated mass in the bottom of the container.

When the bottom of the agitator is brought into contact with this mass, the vertical lower parts 16 prevent the blades from entering the mass to any considerable depth and breaking it into fragments, thereby enabling the lower edges of the blades to scrape the surface of the mass and remove matter therefrom at a rate sufficiently slow to allow the inclined blades to mix the removed matter thoroughly with the liquid contents of the container.

The end of each blade 15 is arranged within the radius of its forward edge or part and allows the outer end of the part 16 to enter the corner of a container and remove solidified or coagulated matter therefrom.

In order to avoid danger of igniting inflammable gas that may be given off by the material being mixed, the ventilating openings at each end of the motor casing are provided with shields of wire gauze. The gauze functions to quench any spark or flame that may develop within the motor casing and prevents it from being communicated to the atmosphere surrounding the casing.

To protect the wire gauze from injury, each opening is provided with a perforated cover plate as shown.

The machine is provided with a stationary rack 17 for attachment to a support and with a portable rack 18 to support the machine upon the top of the mixing container.

The stationary rack 17 has arranged upon each side thereof a horizontal bar 19, which may be connected at one end to a stationary support 20, and a vertical bar 21 secured to the outer end of each bar 19.

The portable rack has two horizontal bars 22 which are spaced from each other and connected by a rod 23.

The bars 22 are adapted to rest upon the top of a pail or other container 24, and each bar is provided with two notches 25 or more notches 25 to hold the rack in position upon the container and to permit it to be adjusted upon containers of different diameters.

Each bar 22 has a vertical bar 26 secured thereto intermediate the ends thereof, and the lower ends of the bars 26 are ordinarily connected to each other.

The bars 26 may be spaced farther apart at the bottom than at the top in order to provide stability.

The machine is provided upon each side thereof and rearwardly from its center of gravity with a bracket 27 which constitutes a clutch to support the frame upon the rack 17 or the rack 18.

The brackets 27 are secured to the motor casing and may be formed integral with each other.

Each bracket 27 has an opening 28 to permit a vertical rack bar to extend therethrough, an abutment 29 at the front of the opening to engage the front edge of the rack bar, and an abutment 30 at the rear of the opening to engage the rear edge of the rack bar.

The position of the brackets relative to the center of gravity of the machine causes the carrying frame to tilt and the abutments 29 and 30 to grip, respectively, the front and rear edges of the vertical bars and support the frame thereon.

As the vibration of the machine might cause the clutches to slip downwardly if both edges of the vertical bars were smooth and straight, the front edges of the bars 21 are provided with serrations 31 and the front edges of the bars 26 are provided with serrations 32 upon which the abutments 29 rest and securely support the carrying frame at a predetermined elevation.

The abutment 29 may be a continuous depending flange extending along the front edge of the bracket, and the abutment 30 may be formed by the metal removed from the opening 28.

When the frame is supported upon the vertical bars, the agitator shaft extends downwardly between the horizontal bars into a mixing container arranged therebeneath.

The tilting of the carrying frame upon the rack causes the agitator to rotate in a plane at an angle to the liquid level and thereby produce a more efficient and rapid mixing of the contents of a container than is ordinarily obtained when the plane of rotation is parallel to the liquid level.

The invention herein set forth is susceptible of various modifications and adaptations without departing from the scope thereof as hereinafter claimed.

The invention set forth in the foregoing specification is hereby claimed as follows:

1. A portable agitating machine, comprising a portable carrying frame provided with two parallel handles arranged apart from each other and endwise to the operator to form the sole support for the entire machine and thereby enable the operator to vary the vertical and angular position of the entire machine in operating the same and said handles having the center of gravity of the entire machine disposed intermediate the same and the ends thereof, an electric motor carried by said frame, a rotatable shaft depending below said frame from a bearing thereon and driven by said motor, and an agitator arranged upon the lower end of said shaft and having its position directed and controlled by manual manipulation of said handles to move and tilt said shaft into different vertical and angular positions.

2. A portable agitating machine, comprising a portable carrying frame provided with two parallel handles arranged above the frame apart from each other and endwise to the operator and having the center of gravity of the entire machine disposed intermediate the same and the ends thereof, an electric motor carried by said frame and having a horizontal shaft, a rotatable vertical shaft depending below said frame and carried by a bearing thereon, gearing connecting said vertical shaft to said motor shaft, and an agitator arranged upon the lower end of said vertical shaft and having its position directed and controlled by manual manipulation of said handles to move and tilt said vertical shaft into different positions.

3. A portable agitating machine, comprising a portable carrying frame provided with two parallel handles arranged apart from each other and endwise to the operator to form the sole support for the entire machine and thereby enable the operator to vary the vertical and angular position of the entire machine in operating the same and said handles having the center of gravity of the entire machine disposed intermediate the same and the ends thereof, a rotatable shaft depending below said frame from a bearing thereon and having its position directed and controlled by manual manipulation of said handles to move and tilt said shaft into different vertical and angular positions, an electric motor carried by said frame and connected to said shaft to drive the same, and an agitator carried by said shaft at the lower end thereof and provided with radial blades arranged at an angle to the axis of said shaft and each blade having its outer peripheral edge receding inward from the outer end of its forward radial edge towards its axis of rotation.

4. A portable agitating machine, comprising a portable carrying frame provided with two parallel handles arranged apart from each other and endwise to the operator to form the sole support for the entire machine and thereby enable the operator to vary the vertical and angular position of the entire machine in operating the same and said handles having the center of gravity of the entire machine disposed intermediate the same and the ends thereof, a rotatable shaft depending below said frame from a bearing thereon and having its position directed and controlled by manual manipulation of said handles to move and tilt said shaft into different vertical and angular positions, an electric motor carried by said frame and connected to said shaft to drive the same, and an agitator carried by said shaft at the lower end thereof and provided with radial blades arranged at an angle to the axis of said shaft and each blade having its forward radial edge vertical and its outer peripheral edge receding inward from the outer end of its forward radial edge towards its axis of rotation.

5. Agitating apparatus, comprising the combination with a rack provided with two upright supporting bars to support an agitating machine over a mixing container, of an agitating machine provided with an electric motor arranged within a frame, a shaft depending from a bearing on said frame to extend at its lower end into said container and connected to said motor to be driven thereby, and a clamp attached to said frame on each side thereof in a fixed position thereon to support said machine upon said bars and each clamp having fixed jaws arranged to grip its corresponding bar therebetween by said clamp being turned by the unbalanced weight of said machine and thereby support said machine upon said bars at different elevations thereon.

6. Agitating apparatus, comprising the combination with a rack provided with two upright supporting bars to support an agitating machine over a mixing container, and horizontal bars carrying said upright bars and arranged to bear upon the rim of the mixing container, of an agitating machine provided with an electric motor arranged within a frame, a shaft depending from a bearing on said frame to extend at its lower end into said container and connected to said motor to be driven thereby, and a clamp attached to said frame on each side thereof in a fixed position thereon to support said machine upon said bars and each clamp having fixed jaws arranged to grip its corresponding bar therebetween by said clamp being turned by the unbalanced weight of said machine and thereby support said machine upon said bars at different elevations thereon.

CHESTER H. BEACH.